US012296607B2

(12) United States Patent
Liao et al.

(10) Patent No.: US 12,296,607 B2
(45) Date of Patent: May 13, 2025

(54) RIBBON SPOOL LOCKING APPARATUS

(71) Applicant: ZEBRA TECHNOLOGIES CORPORATION, Lincolnshire, IL (US)

(72) Inventors: Huanhua Liao, Guanghzou (CN); Bo Liu, Guangzhou (CN); Zhong Gui Wang, Guangzhou (CN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/035,483

(22) PCT Filed: May 5, 2022

(86) PCT No.: PCT/CN2022/090992

§ 371 (c)(1),
(2) Date: May 4, 2023

(87) PCT Pub. No.: WO2023/212868

PCT Pub. Date: Nov. 9, 2023

(65) Prior Publication Data

US 2024/0351359 A1 Oct. 24, 2024

(51) Int. Cl.

| | |
|---|---|
| ***B41J 33/22*** | (2006.01) |
| ***B41J 2/325*** | (2006.01) |
| ***B41J 33/00*** | (2006.01) |
| ***B41J 35/28*** | (2006.01) |

(52) U.S. Cl.

CPC ............... *B41J 33/22* (2013.01); *B41J 2/325* (2013.01); *B41J 33/003* (2013.01); *B41J 35/28* (2013.01)

(58) Field of Classification Search

CPC . B41J 33/22; B41J 2/325; B41J 33/003; B41J 35/28; B41J 17/32; B41J 29/00; B41J 29/023; B41J 29/026; B41J 29/02

See application file for complete search history.

(56) References Cited

FOREIGN PATENT DOCUMENTS

| | | | |
|---|---|---|---|
| CN | 102189818 | A | 9/2011 |
| CN | 103442897 | A | 12/2013 |
| CN | 106232372 | A | 12/2016 |
| JP | 2010036439 | A | 2/2010 |
| JP | 2017052157 | A | 3/2017 |

OTHER PUBLICATIONS

International Search Report and Written Opinion for PCT Application No. PCT/CN2022/090992 mailed on Nov. 25, 2022.

*Primary Examiner* — Kristal Feggins

(57) ABSTRACT

An example disclosure printer includes a base assembly, a lid pivotably attached to the base assembly, and a ribbon frame pivotably connected to the base. The ribbon frame is configured to receive at least one ribbon spool; a ribbon locker configured to interact with the ribbon spool via a spool gear assembly, the ribbon locker comprising: a biasing element to maintain a biasing force on the ribbon locker in a first direction, a first pawl, a second pawl, and a central pivot, wherein: when the ribbon locker is rotated by the actuator in the first direction, the first pawl is brought into contact with the spool gear assembly, and when the ribbon locking assembly is rotated in a second direction opposite the first direction, the second pawl is brought into contact with the spool gear assembly.

19 Claims, 5 Drawing Sheets

RIBBON SPOOL LOCKING APPARATUS

BACKGROUND OF THE INVENTION

Unspooled or loosely spooled ribbons (e.g., ink ribbons) can cause issues within media processing devices (e.g., printers) from a lack of tension in the ribbon. Some media processing devices utilize mechanisms to maintain tension on the ribbon to avoid those issues.

SUMMARY

An example media processing device disclosed herein includes a base assembly comprising a lower frame and a drive gear. The example media processing device has a lid pivotably attached to the base assembly, the lid being movable between a closed position and an open position, wherein an actuator attached to the lid is configured to apply a force to a ribbon locking assembly. The example media processing device includes a ribbon frame pivotably connected to the lower frame, wherein the ribbon frame is configured to pivot between a lowered position when the lid is in the closed position and a presenting position when the lid is in the open position, and the ribbon frame is configured to receive a ribbon spool. The example media processing device includes a ribbon locker configured to engage with the ribbon spool via a spool gear assembly. The ribbon locker includes a biasing element to maintain a biasing force on the ribbon locker in a first direction, a first pawl, a second pawl, and a central pivot, wherein, when the ribbon locker is rotated by the actuator in the first direction, the first pawl contacts the spool gear assembly, and when the ribbon locking assembly is rotated in a second direction opposite the first direction, the second pawl contacts the spool gear assembly.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION OF THE INVENTION

Figure 1:
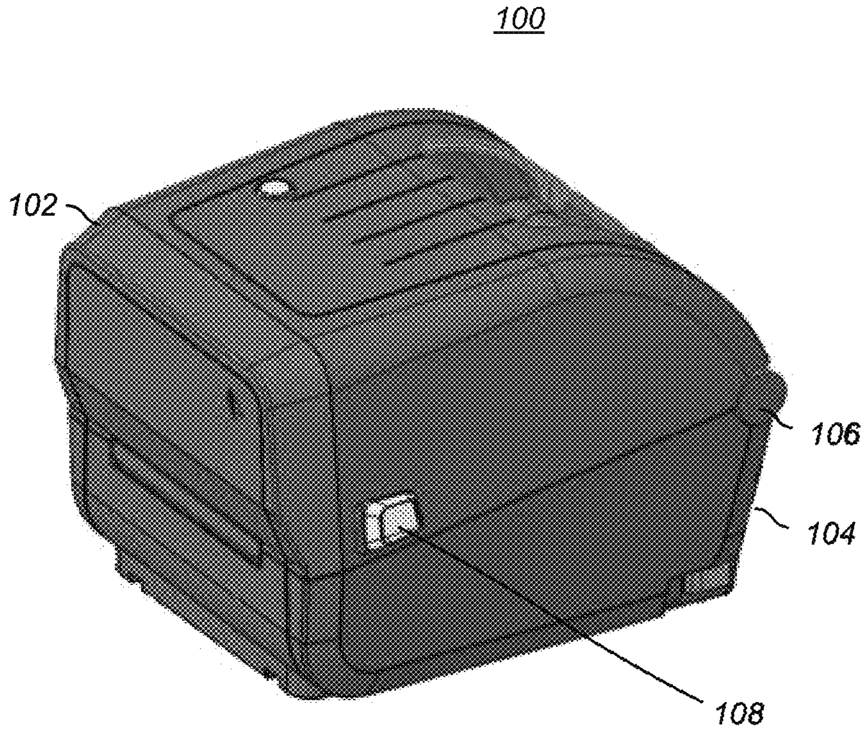
FIG. 1 illustrates a housing view of a printer according to examples disclosed herein.

Various embodiments now will be described more fully hereinafter with reference to the accompanying drawings, in which some, but not all embodiments are shown. Examples disclosed herein may be embodied in many different forms and should not be construed as limited to the examples set forth herein Some media processing devices, such as thermal-transfer printers, are configured to print and/or encode media, such as carrier-supported labels, tag stock, tickets, wristbands, and/or linerless labels. Media processing devices print and/or encode the media by drawing the media from a holder and routing the media proximate processing components (e.g., printhead and/or RFID reader/encoder).

From time to time, media processing devices exhaust the available supply of media, thereby requiring a user to replace the media supply. Other consumables, such as ink ribbon in a thermal-transfer printer, are also periodically replaced. Replacing consumable components of a media processing device can be complex and arduous, with the time to replace such components resulting in costly down-time of the media processing device. Additionally, replacement of consumable components is difficult for media processing devices of relatively small form factors, such as desktop or mobile printers, as the components are closely arranged inside a relatively small housing. As such, it is desirable for a media processing device to provide easy access to the consumable components to facilitate relatively quick and accurate replacement of consumable components. In some embodiments the ribbon may be not be an ink ribbon but rather an alternate type of spooled media, such as retransfer ribbon, dye-sublimation ribbon, metallic ribbon, chemistry transfer ribbons or other materials.

Some media processing devices utilize a ribbon frame to receive a ribbon wrapped around a holder, such as a plastic or cardboard hollow cylinder. The combination of the ribbon and the holder about which the ribbon is wound is referred to herein as a “spool”. Some spools are carried by a cartridge. In media processing devices that utilize a ribbon frame, when the media processing device is closed the ribbon frame positions the spool for operation (e.g., printing); when the media processing device is closed the ribbon frame raises the spool to a loading or presenting position to allow the spool to be removed or installed. To achieve high quality printing, the ribbon is routed past the printhead, in conjunction with media, while being kept at relatively uniform tension. That tension is created by the forces on the ribbon including the motor and gear train associated with the take up spool and ribbon supply spool, any clutch assemblies associated with the gear trains, and forces on the ribbon created by the nip between the printhead and the platen roller through which the ribbon passes. If the ribbon tension falls too low or gets too high, the ribbon might wrinkle, c, crimp, or stretch causing poor print quality (PPQ). When the printhead is opened to replace media or to conduct maintenance near the media path the forces on the ribbon change, and could also be subject to additional forces such as a user’s hands, tools, or other items placed proximate the ribbon path. In some cases this may cause the ribbon to partially unspool from the supply spindle. When the printhead is then closed, the tension on the ribbon may have changed so that it is no longer in an appropriate range for printing. Other related issues may also sometimes occur, such as wasted ribbon, buildup of electrical static charges, or wrinkled ribbon. Therefore, it is desirable that the spool is prevented from unintentional unwinding. As detailed further below, examples disclosed herein include a locking device to lock a spool in place to prevent the spool from rotating throughout multiple stages of operations and positions and, thus, the ribbon on the spool avoids unwanted movements. As the ribbon passes between a supply spool and a take-up spool, if the rotation of each spool can be controlled, the tension within the ribbon can be maintained. During times when the printer is not processing media and is idle, it is necessary to maintain the position of the supply and take-up spools such that the tension of the ribbon is maintained. For thermal-transfer printers, it is important that the ribbon maintains a constant tension with the spool during operation as that maintains smoothness in the ribbon as the ribbon passes over the printhead. If the ribbon is not kept under tension and slack forms in the ribbon during operation, the spool may bunch, gather, or crease during printing, causing imperfections in the printed media.

FIG. 1 illustrates a printer in which examples disclosed herein may be implemented. The example printer of FIG. 1 depicts an outer view of a housing. While the illustrated embodiments and description provided herein are directed primarily to a printing device, other devices such as media encoders, label applicators, or laminators, may benefit from the examples disclosed herein. The example printer 100 of FIG. 1 is a thermal-transfer printer that uses a printhead to apply heat to an ink ribbon as the ink ribbon is moved passed the printhead in conjunction with media to be processed, partially melting a binder of the ink ribbon onto the media at particular locations according to print instructions, thereby causing the printer 100 to create indicia on the media.

The printer 100 of FIG. 1 includes a base assembly 104 and a lid 102. As shown in FIG. 1, the lid 102 is in a closed position in which the lid 102 is secured to the base assembly 104. The lid 102 is pivotably attached to the base assembly 104 along a hinge 106 along a back side of the printer 100. In the illustrated embodiment, the lid 102 is configured to, when opened, pivot along the hinge 106 to an open position. The example lid 102 supports an actuator 108 that a user engages to unlock the lid 102 from the closed position to allow the lid 102 to move to the open position. As illustrated in FIG. 1, the lid pivots about a pivot axis when moving between the open and closed position. As illustrated in FIG. 1, the actuator 108 slides along a plane generally perpendicular to the pivot axis, which unlatches the lid from the closed position to move to the open position.

Figure 2:
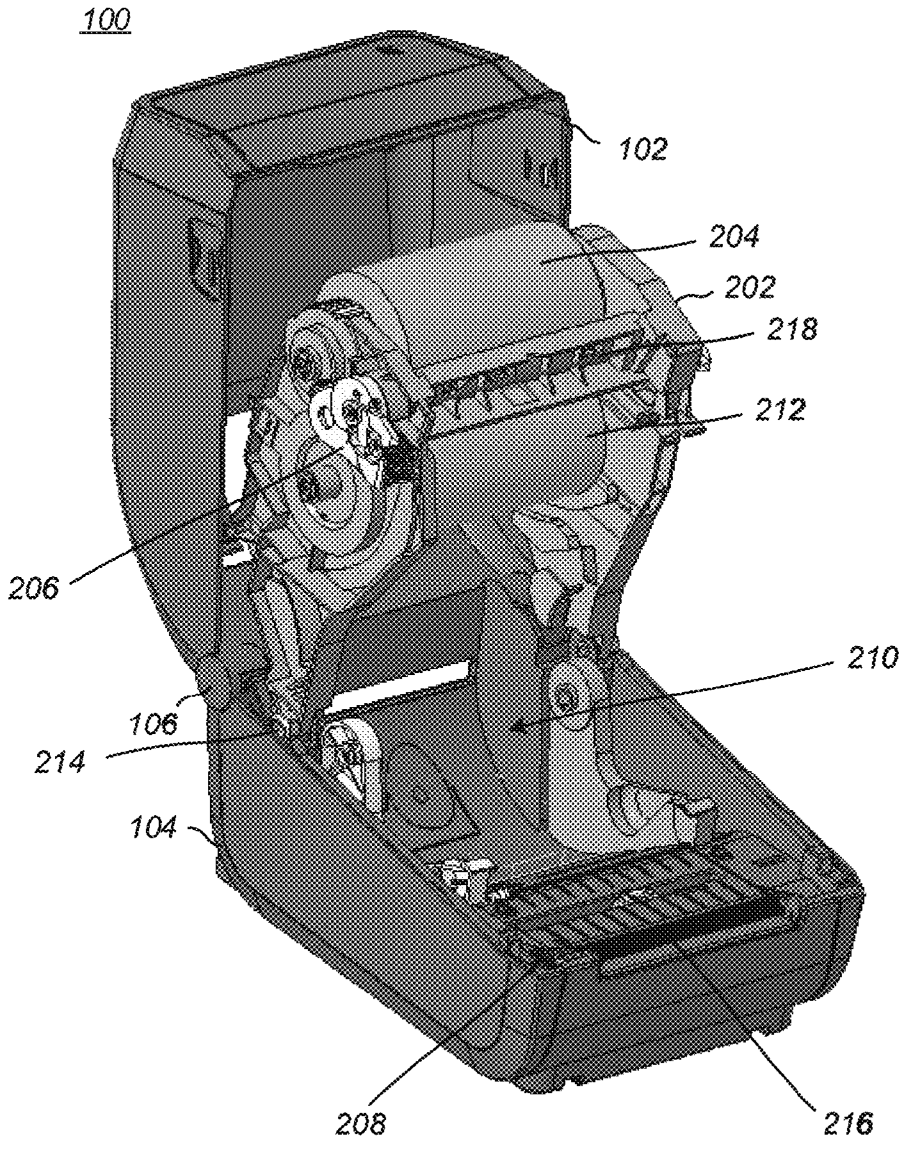
FIG. 2 illustrates a detail view of the printer of FIG. 1 showing an example ribbon frame and an example ribbon locking apparatus according to examples disclosed herein.

FIG. 2 illustrates the example printer 100 of FIG. 1 in the open position. In the depicted embodiment, when the printer 100 is in the open position, the lid 102 is pivoted away from the base assembly 104. In the illustrated, when the printer 100 is in the open position, an example ribbon frame 202 is accessible to a user. The example ribbon frame 202 of FIG. 2 supports a supply spool 212 and a take up spool 204. The supply spool 212 is loaded into the printer 100 with a new supply of ribbon and the take up spool 204 collects the spent ribbon after printing. When new ribbon is loaded into the printer 100, the ribbon is loaded around the edge of the printhead 218 and around to the take up spool 204.

As shown in the example of FIG. 2, when the lid 102 and the ribbon frame 202 are both in the open position, a cavity 210 within the printer 100 is accessible. The cavity 210 receives media, such as a roll of labels, to be processed by the printer 100.

In the illustrated embodiment in FIG. 2, the ribbon frame 202 is configured to raise in response to the lifting of lid 102. The example ribbon frame 202 is configured to move between the open and closed position about a pivot point 214.

As shown in FIG. 2, the example ribbon frame 202 supports an example locker 206 disclosed herein. The example locker 206 is configured to interact with the spools 204 and 212 to prevent unspooling of the ribbon therefrom. The interaction between the locker 206 and the spools 204 and 212 will be described in further detail below. The locker 206 also interacts with the base 104 by latching with the base 104 and meshing with a drive gear 208. In the illustrated embodiment, the locker 206 is only present on one side of the ribbon frame 202, however in some examples the locker 206 is present on either side or both sides of the ribbon frame 202.

Figure 5A:
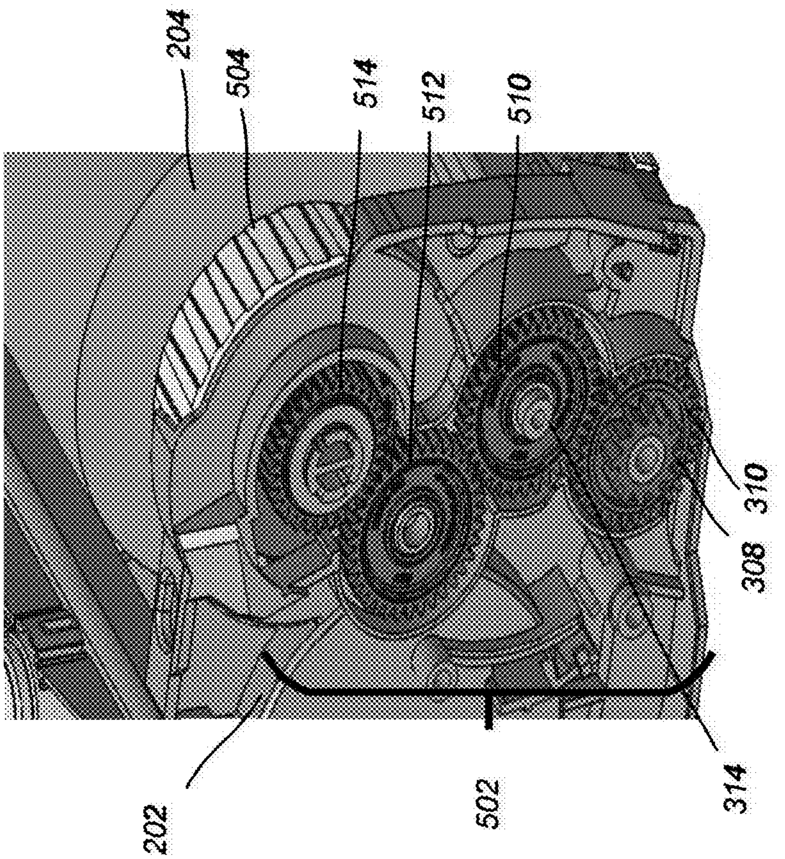
FIGS. 5A-5B illustrate a detail view of a spool gear assembly typically positioned under the ribbon locking apparatus, wherein the example ribbon frame is in the open and closed position respectively.
Figure 5B:
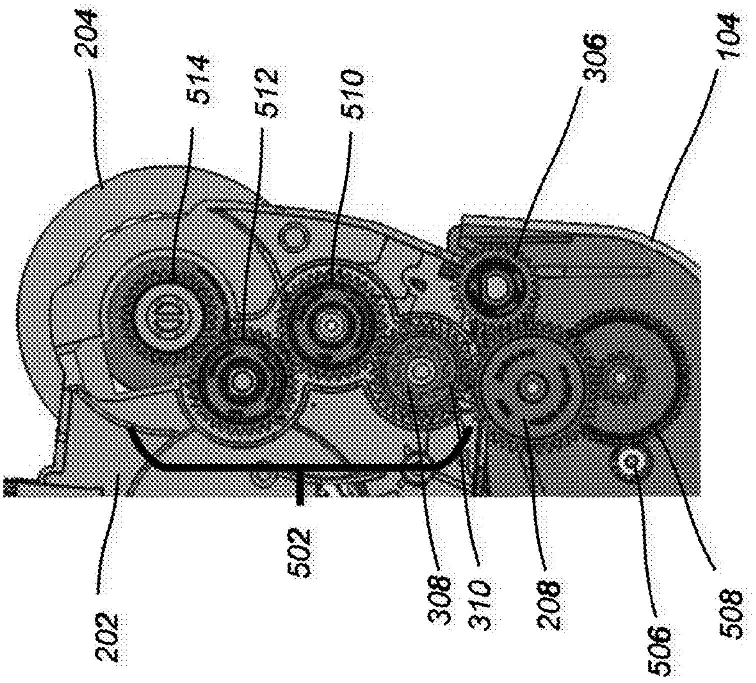

As can be seen in FIG. 2 and similarly in FIGS. 5A and 5B, the drive gear 208 is housed in the base 104. In the illustrated embodiment, the drive gear 208 is mechanically connected with a motor gear 506 via linkage gear 508 (see FIG. 5B). The motor gear 506 is connected to a motor (not shown). In the illustrated embodiment, the motor also drives a platen 216 of the printer 100 to advance media within the printer. In some embodiments, a separate motor is used to drive a platen gear 504 attached to an end of the platen 216 that rotates the drive gear 208. The drive gear 208 is meshed to the driven gear and the spools 204 and 212 such that the rotation of the platen 216 is in congruence with the spools 204 and 212. This allows the platen 216 to drive the media past the printhead while maintaining tension on the ribbon passing between the spools 204 and 212. When the lid 102 is in the closed position and the ribbon frame 202 is lowered into the closed position, a driven gear engages with the drive gear 208, which is explained further below.

Figure 3:
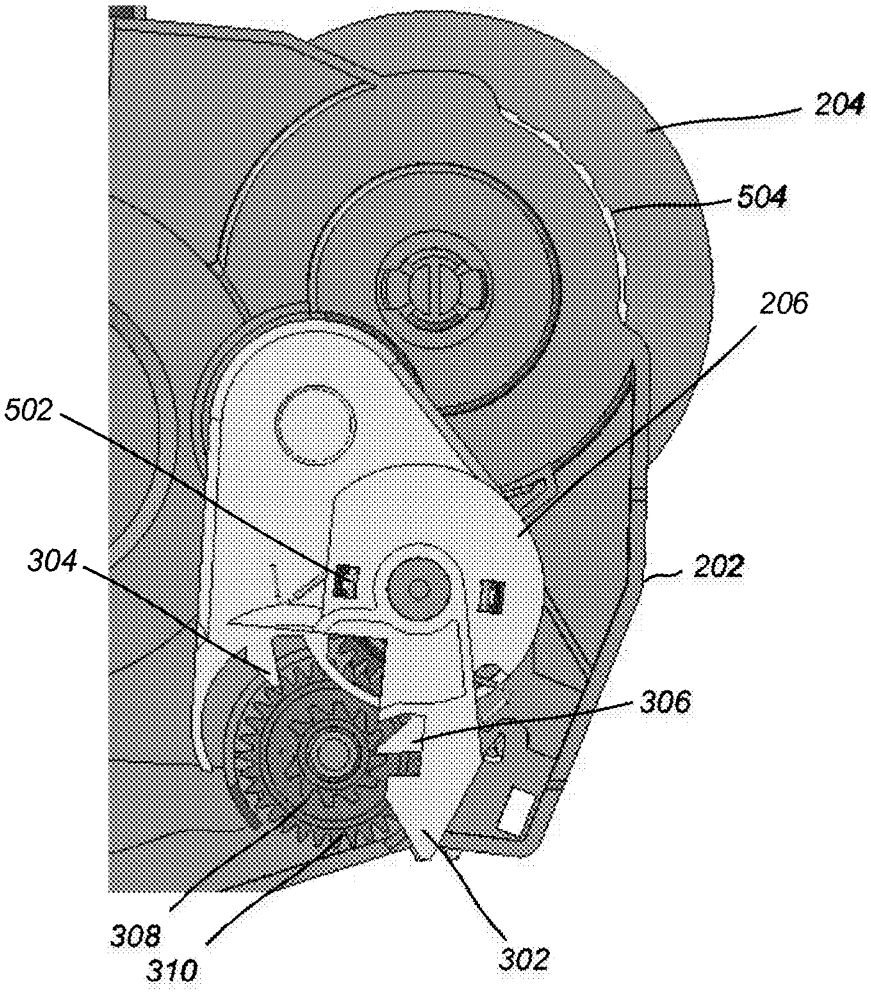
FIG. 3 illustrates a view of the example ribbon locking apparatus of FIG. 2.

FIG. 3 illustrates a view of the example locker 206 of FIG. 2. The locker 206 of FIG. 3 is mounted on an outer surface of the ribbon frame 202 (i.e., the surface opposing the inner surface of the ribbon frame to which the spools 204 and 212 are mounted). The example locker 206 includes a latch 302, a first pawl 304, a second pawl 306, a spur gear 308 and a driven gear 310, all of which to be described in further detail below. In the depicted embodiments, the latch 302 is used to lock the lid 102 to the base 104 and maintain the lid 102 in the closed position. The latch 302 keeps the lid 102 in the closed position by hooking into a fixed element of the base 104. In the illustrated example, the latch 302 is coupled to the actuator 108. Thus, when a user applies a force to the actuator 108 the latch 302 causes the ribbon frame 202 to unlatch from the base 104.

As illustrated in FIG. 3, the first pawl 304 and the second pawl 306 are fixed to the locker 206, such that when the locker 206 rotates in either a first direction or second direction, the first pawl 304 or the second pawl 306 engages with the spur gear 308. As illustrated in FIG. 3, the locker 206 rotates independently of the spur gear 308 and the driven gear 310. As illustrated in FIG. 3, the spur gear 308 and the driven gear 310 are part of the same gear, where the spur gear 308 is concentric with the driven gear 310. The locker 206 covers and protects a spool gear assembly 502 including a meshed gear train that includes at least the driven gear 310, the spur gear 308 and a spool gear assembly 502 described below. As illustrated in FIG. 3, the spool gear 312 is partially obscured and is connected to an end of a core of the spool 204. The spool gear assembly 502 of FIG. 3 is fixedly meshed with the spool 204 and meshed with the spool gear assembly 502, such that the spool end 504 rotates with both the spool 204 and the spool gear assembly 502. In other words, if the spool gear assembly 502 is locked in place and is unable to rotate, then the spool gear 312, the spool 204, the spur gear 308 and the driven gear 310 are all also locked in place.

FIGS. 5A-5B show the spool gear assembly 502 that lies under the locker 206. As illustrated in FIG. 5A, the spool gear assembly 502 includes the spur gear 308/driven gear 310, a first gear 510, a second gear 512, and a third gear 514. As illustrated in FIG. 5A, the driven gear 310, the first gear 510, the second gear 512, and the third gear 514 are meshed such that if any of the gears within the spool gear assembly 502 rotate, the remaining gears rotate in kind, and similarly, if any of the gears are prevented from moving, the remaining gears also cannot move. In other words, if the driven gear 310 is forced to rotate, then the third gear 514 will rotate in kind. Similarly, as illustrated in FIG. 5A, if driven gear 310/spur gear 308 is locked in place, then the third gear 514 does not rotate.

As illustrated in FIG. 5A, the third gear 514 is concentrically connected to a ribbon holder 504 such that the third gear 514 and the ribbon holder 504 rotate together. The third gear 514 and the ribbon holder 504 can be formed as two parts of the same gear or can be connected via gear linkages, snap fit, or any other method known to allow joined rotation. As illustrated in FIG. 5A, the ribbon holder 504 is connected with the ribbon spool 204 such that the spool end 504 rotates with the ribbon spool 204. As illustrated in FIG. 5A, if any of the gears within the spool gear assembly 502 were held stationary, the third gear 514 would be held stationary and also the ribbon holder 504 and the spool 204. Comparatively, if the gears within the spool gear assembly 502 rotate, then the ribbon holder 504 and the spool 204 also rotates.

FIG. 5B illustrates the ribbon frame 202 in the closed position and adjacent to the base 104. When in the position illustrated in FIG. 5B, the driven gear 310 meshes with the drive gear 208. As illustrated in FIG. 5B, the base 104 comprises a motor gear 506, the motor gear 506 is driven by a motor (not seen). As illustrated in FIG. 5B, motor gear 506 meshes with linkage gear 508, which is meshed with drive gear 208. In some embodiments, clutches may be used within the gear assemblies either the spool gear assembly 502 or near the motor gear 506. In the embodiments featuring clutches, the clutch prevents over loading of force between the gears which leads to overloading of tension on the ribbon. As the clutch begins to get overloaded with force, the clutch will slip and prevent damage to the system. As illustrated in FIG. 5B, the drive gear 208 also meshes with platen gear 306. This gear configuration allows for the platen 216 to be driven via the platen gear 306, wherein the platen 216 is configured to drive media and ribbon past the printhead for processing. As the platen 216 drives the media and ribbon, the spool gear assembly 502 allows for the platen and the spool 204 to rotate together such that ribbon is wound on to the spool 204 after passing the platen 216.

In the illustrated FIG. 3, a biasing element 312 is positioned between the locker 206 and the spool gear assembly 502. The biasing element 312 will be described further below. The biasing element 312 maintains tension and applies a force on the locker 206 to rotate the locker 206 in a clockwise direction, per the orientation of FIG. 3, causing the latch 302 to remain latched.

Figure 4C:
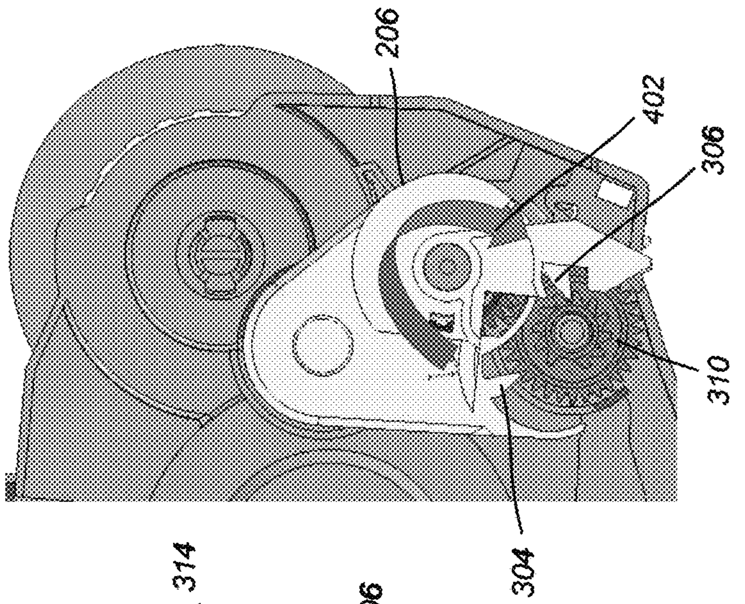
FIGS. 4A-4C illustrate the example ribbon locking apparatus of FIGS. 2 and 3 rotating between a first position, second position, and third position, respectively.
Figure 4B:
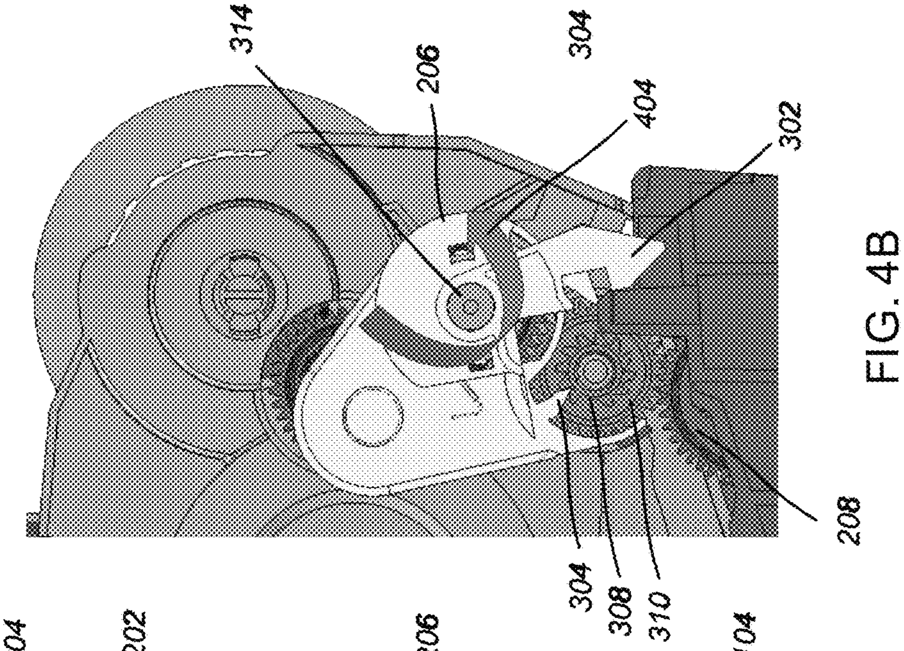
Figure 4A:
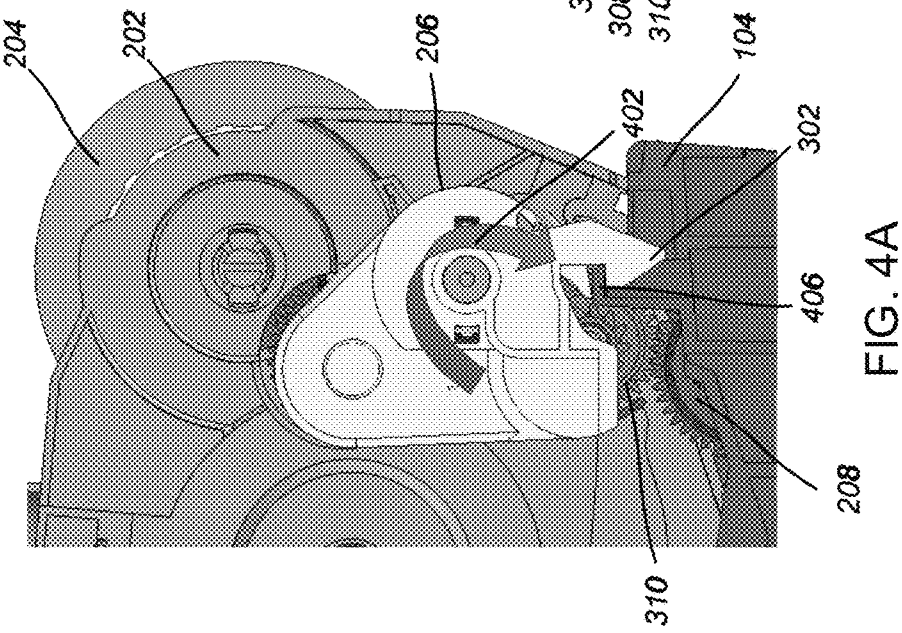

FIGS. 4A-4C illustrates the operation of the ribbon lock 206 during different movement positions of the ribbon frame wherein the ribbon lock 206 operates to prevent rotation of the ribbon spool.

As illustrated in FIGS. 4A-4C, there are three different scenarios in which the ribbon frame 202 will move and require the spools 204 and 212 to be held stationary such that they do not allow the ribbon to unspool or lose tension.

The embodiment illustrated in FIG. 4A depicts when the ribbon frame 202 is in a closed position and is lowered to the base 104. As the frame 202 approaches the base, the latch 302 attaches to the base 104 and secures the ribbon frame 202 in the closed position. When the latch 302 attaches to the base 104, the latch 302 is referred to as being in a latched position. When the frame 202 is in the position depicted in FIG. 4A, this is the same position as depicted in FIG. 5B, wherein the drive gear 208 and the driven gear 310 are meshed together such that when the drive gear 208 is rotated via the motor gear 506 the driven gear 310 also rotates. Also, as illustrated in FIGS. 5B and 4A, when the drive gear 208 is stationary, the driven gear 310 is also held stationary, and via the spool gear assembly 502, the spool 204 is held stationary and unable to unspool ribbon and release the tension the ribbon is under, While the locker 206 is in the position depicted in FIG. 4A, the first pawl 304 and the second pawl 306 do not contact the spur gear 308. As such, the spur gear 308, in the position depicted in FIG. 4A, freely rotates with the spool gear assembly 502 during standard printer operations. While in this position, the driven gear 310 attached to the ribbon frame 202 is brought into contact with the drive gear 208 of the base.

Although the example locker 206 includes the first and second pawls 304 and 306 to stop rotation of the spur gear 308, additional or alternative examples employ other type(s) of stopping mechanism(s), such as clutches, friction plates, or other means of preventing the ribbon from unwinding.

As the position of FIG. 4A is the position the ribbon frame 202 is in during operation of the printer, this embodiment allows the spur gear 308 to move freely and unobstructed by the first and second pawls 304 and 306 as the drive gear 208 drives the driven gear 310. In the embodiment illustrated in FIG. 4A, the spur gear 308 and the driven gear 310 are concentric. In some examples, the spur gear 308 is part of the same component as the driven gear 310 or different gears than the driven gear 310. In the illustrated embodiment, the drive gear 208 rotates which causes the driven gear 310 to rotate and via a spool gear assembly 502 cause the spool 204 to rotate accordingly. The spool 204 is driven such that ribbon is fed from the spool 212, around the printhead for printing. The process for driving the spool 204 is further explained in FIGS. 5A and 5B.

The example locker 206 of FIG. 4A acts as a cover for the spool gear assembly 502 that extends from the driven gear 310 to the ribbon spool. The example locker 206 protects the spool gear assembly 502 from outside contact while also ensuring that the individual gears of the spool gear assembly 502 are kept on their respective gear posts.

In the illustrated embodiment of FIG. 4A, while the latch 302 is secured to the base, the driven gear 310 maintains contact with the drive gear 208 of the base 104, which prevents unwanted rotation of the driven gear 310, which is related to the movement of the ribbon spool 204 as described above. As illustrated in FIG. 4A, the latch 302 is maintained in contact with base latch element 406. As illustrated in FIG. 4A, the base latch element 406 is a ledge element that is integral with the base 104 and is resilient to maintain the ribbon frame 202 in the closed position. As illustrated in FIG. 4A, the latch 302 maintains a latched position with the base latch element 406 via the biasing force applied on the locker 206 by the biasing element 312.

In the illustrated embodiment, the latch 302 unlatches from the base 104 when a user engages (e.g., presses) the actuator 108 to open the lid 102, and in turn, disengages the latch 302 from the base latch element 406. When the actuator 108 is engaged, the example locker 206 is rotated in a first direction 404 into a second position illustrated in FIG. 4B. The actuator 108 is configured to interact with the locker 206 such that movement of the actuator 108 causes contact with the locker 206. The contact between the actuator 108 and the locker 206 results in rotation of the locker 206.

When the ribbon frame 202 is in the closed position and the spool gear assembly 502 is meshed with the drive gear 208, the spools 204 and 212 do not rotate unless the motor drives the system. However, when the ribbon frame 202 is moved to an open position and the spool gear assembly 502 is no longer meshed with the drive gear 208, there is nothing immediately in place to prevent rotation of the spool gear assembly 502 and also the spools 204. It is important that the spool 204 does not move when not driven because if the spool 204 loosens, the ribbon on the spool 204 loses tension, which causes issues with printing. Therefore, it is imperative during the opening and closing of the ribbon frame 202 that the spool gear assembly 502 is prevented from rotating.

When the actuator 108 is moved by the user to open the lid 102, the actuator 108 contacts the locker 206 and causes the locker 206 to rotate in the first direction 404 around the pivot 314 into the second position shown in FIG. 4B. When the locker 206 pivots into the second position, the latch 302 disengages from the base 104 and the drive gear 208 disengages from the driven gear 310. In the illustrated embodiment, as the driven gear 310 and the drive gear 208 disengage, the spool 204 would be free to unintentionally rotate and unspool if unacted upon by the locker 206. As the driven gear 310 and the drive gear 208 disengage, the first pawl 304 engages with the spur gear 308, as depicted in FIG. 4B. In the illustrated embodiment, the user is acting against the biasing force applied by the biasing element 312 by rotating the locker 206 in the first direction 404 and therefore, if the user were to stop applying a force against the actuator 108, the biasing force causes the locker 206 to rotate in the second direction 402 opposite the first direction 404.

When the biasing force causes the locker 206 to rotate in the second direction 402, the first pawl 304 disengages from the spur gear 308 and the second pawl 306 engages with the spur gear 308, as seen in FIG. 4C. In FIG. 4C, the ribbon frame 202 is in the open position. When the locker 206 is free to rotate as is depicted in FIG. 4C, the second pawl 306 engages with the spur gear 308 such that the spur gear 308 cannot rotate which in turn prevents the spool gear assembly 502 from rotating and therefore prevents the spool 204 from rotating as described above. In the illustrated embodiment, the locker 206 then stays in the position illustrated in FIG. 4C if the printer remains open. Once the printer is closed and the ribbon frame 202 rotates to the closed position, the latch 302 once again latches onto the base 104 and the locker 206 rotates to the position see in FIG. 4A.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. The following claims are hereby incorporated into the Detailed Description, with each claim standing on its own as a separately claimed subject matter.

That which is claimed:

1. A printer comprising:
a base;
a lid pivotably attached to the base, the lid movable between a closed position in which the lid is secured to the base, and an open position in which the lid is unsecured from the base;
a ribbon frame pivotably connected to the base, wherein:
the ribbon frame is configured to pivot between a first position when the lid is in the closed position and a second position when the lid is in the open position,
the ribbon frame is configured to receive a spool;
a locker configured to interact with the spool via a spool gear assembly, the locker comprising:
a biasing element to apply a biasing force on the locker in a first direction,
a first pawl,
a second pawl, and
a central pivot,
wherein:
when the locker is rotated by the actuator in the first direction, the first pawl is brought into contact with the spool gear assembly, and
when the locker is rotated in a second direction opposite the first direction, the second pawl is brought into contact with the spool gear assembly.

2. The printer of claim 1, wherein the locker further comprises a latch.

3. The printer of claim 2, wherein the latch is configured to secure the ribbon frame to the base when the ribbon frame is in the first position.

4. The printer of claim 3, wherein, when the latch is secured to the base:
the drive gear is configured to engage the spool gear assembly, and
the first pawl and the second pawl are disengaged from the spool gear assembly.

5. The printer of claim 1, wherein the spool gear assembly comprises a spur gear which is contacted by the first pawl when the locker is rotated in the first direction and the second pawl when the locker is rotated in the second direction.

6. The printer of claim 1, wherein the spool is connected with a spool gear which rotationally pairs with the spool.

7. The printer of claim 1, wherein the biasing element is a torsional spring.

8. A locker comprising:
a first stopping mechanism;
a second stopping mechanism;
a centrally located pivot; and
a biasing element configured to apply a biasing force to the housing in a first direction; wherein:
the biasing force rotates the first stopping mechanism in the first direction such that the first stopping mechanism engages with a spur gear, and
when an external force is applied in a second direction opposite the first direction, the second stopping mechanism engages with the spur gear.

9. The locker of claim 8, further comprising a latch, wherein the biasing element forces the latch into a latched position.

10. The locker of claim 8, wherein the biasing element is a torsional spring.

11. The locker of claim 8, wherein the first stopping mechanism and the second stopping mechanism are pawls.

12. The locker of claim 8, wherein the first stopping mechanism and the second stopping mechanism are one of clutches, friction brakes, or pawls.

13. The locker of claim 8, further comprising a spool gear assembly comprising the spur gear and a spool gear, the spool gear assembly arranged such that preventing rotation of a gear of the spool gear assembly prevents rotation of all other gears of the spool gear assembly.

14. The locker of claim 13, wherein the spool gear is secured to a spool such that the spool gear rotates with the spool.

15. A method for preventing unspooling of a ribbon in a printer, the method comprising:
when a printer lid is closed, preventing a ribbon spool from unwinding via a spool gear assembly, wherein the spool gear assembly comprises a spur gear;
when the printer lid is opened, engaging a spur gear with a first pawl to prevent the ribbon spool from unwinding; and
when the printer lid is in the open position and t the actuator is released, engaging a second pawl with the spur gear from a side opposite where the first pawl engages the spur gear.

16. The method of claim 15, wherein preventing the ribbon spool from unwinding via the spool gear assembly is done by engaging a driven gear of the spool gear assembly with a drive gear of the printer.

17. The method of claim 15, wherein the first pawl and the second pawl are part of a ribbon locker.

18. The method of claim 17, wherein the ribbon locker rotates on a pivot such that rotation in a first direction causes engagement of the first pawl and rotation in a second direction causes engagement of the second pawl.

19. The printer of claim 1, wherein the lid pivots about a pivot axis, the printer further comprising an actuator configured to slide along a plane generally perpendicular to the pivot axis to unlock the lid from the closed position to move to the open position.

* * * * *